United States Patent [19]

Goodwin

[11] 4,364,987
[45] Dec. 21, 1982

[54] FIRE DOOR CONSTRUCTION

[75] Inventor: Walter A. Goodwin, Mississauga, Canada

[73] Assignee: Cawm-Crete International Limited, Ontario, Canada

[21] Appl. No.: 296,794

[22] Filed: Aug. 27, 1981

[30] Foreign Application Priority Data

May 14, 1981 [CA] Canada .................................. 377574

[51] Int. Cl.³ ...................... B32B 23/02; E04C 2/34; E04B 1/74; B28B 1/16
[52] U.S. Cl. ..................................... 428/192; 52/404; 52/601; 52/809; 264/112; 264/219; 264/256; 264/333; 428/71; 428/74; 428/68; 428/317.9
[58] Field of Search ...................... 428/68, 71, 74, 192; 52/404, 601, 809; 264/112, 219, 256, 333

[56] References Cited

U.S. PATENT DOCUMENTS

| 3,153,817 | 10/1964 | Pease, Jr. | 52/809 |
| 3,590,111 | 6/1971 | Gebefügi | 264/333 |
| 3,625,808 | 12/1971 | Martin | 428/68 |
| 4,104,828 | 8/1978 | Naslund et al. | 52/809 |
| 4,147,004 | 4/1979 | Day et al. | 52/809 |
| 4,159,302 | 6/1979 | Greve et al. | 264/333 |
| 4,185,066 | 1/1980 | Temple | 264/333 |
| 4,186,536 | 2/1980 | Piazza | 428/71 |
| 4,238,544 | 12/1980 | Mullet | 428/71 |

Primary Examiner—William R. Dixon, Jr.
Attorney, Agent, or Firm—Zarley, McKee, Thomte, Voorhees & Sease

[57] ABSTRACT

This invention discloses a core for a fire-resistant door with wooden stiles and rails forming the peripheral edge and a slab filling the space therebetween comprising a cured mixture of magnesium oxi-chloride with inclusions of fibreglass strands and perlite. Also disclosed is a method of making same in which the wooden stiles and rails form the sides of a mold and the core is formed by pouring a mixture on a flat surface with a non-adhering coating and curing the core in place so that it bonds to the stiles and rails.

9 Claims, 5 Drawing Figures

FIRE DOOR CONSTRUCTION

This invention relates to an improved core construction for fire proof doors, and a process for the manufacture of same.

As building codes and fire regulations become more stringent and universal, the need and applications for fire-resistant doors become more numerous and varied. The increasing use of such fire-resistant doors in public buildings and the possibility of use in private houses has focused attention on the construction and method of manufacture of fire doors as well as the effectiveness and cost thereof.

While the so-called "fire-proof" doors which are really more accurately described as fire-resistant doors have been known for some time, they have always presented one or more of several problems to architects, designers, and builders.

Some, of course, do not meet particular building codes or fire regulation specifications, or at least do not meet all of a variety of such regulations in the various jurisdictions in which they might be sold or used. Others such as steel doors are very expensive and complicated to manufacture, or require expensive materials for their construction. Some such as steel doors transmit heat readily, or are so heavy that they require special construction in the door frame before they can be hung, or require special hardware. Many, bacuase of one or more the aforesaid problems, also are discouragingly expensive and therefore not used as often as might be desirable.

It is therefore the purpose of this invention to provide a core for a fire-resistant door which is effective to retard the penetration and spread of fire or the transmission of heat, is relatively strong and durable, is sufficiently light to avoid the trouble and expense of special door frame structures on which to hang it, is relatively easy to manufacture, and provides a method for manufacture which is relatively inexpensive and thereby provides an inexpensive product.

The shortcomings of the prior art are sought to be overcome and the foregoing objects and purposes are achieved by the present invention which provides a core for a fire-resistant door comprising a pair of veneer skins on opposite surfaces of said core in which said core comprises wooden rails and stiles forming and defining the peripheral edges of said door, and a slab filling the cavity of said core between said skins and surrounded by said stiles and rails, which slab comprises a cured mixture of magnesium oxide and magnesium chloride containing inclusions of fibreglass strands and perlite. Ideally, the core slab has a border area adjacent to the stiles and rails composed of a cured mixture of magnesium oxide and magnesium chloride containing fibreglass strands and approximately 80% by volume of wood chips.

The core is produced by a method which is relatively simple and inexpensive without requiring elaborate machinery and automated controls or extensive production runs. The method of the present invention involves the steps of forming a rectangular frame of rails and stiles, fastening a sheet of stiff planar material to the underside of said frame to provide a bottom to a mold formed by the cavity surrounded by said stiles and rails, and pouring a mixture of material curable to form a core slab in the cavity formed by the frame and allowing said material to cure and bond to said stiles and rails to form a core. The core is sanded after curing to create a smooth flat surface on either side suitable for applying a skin of veneer as desired in the finished door.

The method is improved if the stiff planar material is overlain by a layer of non-adhering film such as freezer wrap or some other similar polymer film.

Ideally, a core is formed by placing inserts along the inner surfaces of the stiles and rails before pouring the central portion of the core and removing the inserts after the central portion has cured sufficient to resist slumping and filling the space vacated by the inserts with a material comprising magnesium oxide and magnesium chloride with inclusions of wood chips to form a tough dense border between the central portion of the slab and the stiles and rails.

Ideally, the mixture is allowed to cure during the initial four hours at a temperature of approximately 70°±8° F. at a humidity of 50%±5% and for a further six hours is cured by heating to approximately 125° F. at low humidity of approximately 8%.

We have found that the method is enhanced if the stiff planar material used on the undersurface of the frame is a pegboard having numerous holes therethrough allowing the dissipation of heat during the initial four hour curing which is exothermic.

The present invention may be better explained by the following description of one embodiment thereof with reference to the drawings in which.

Figure 1:
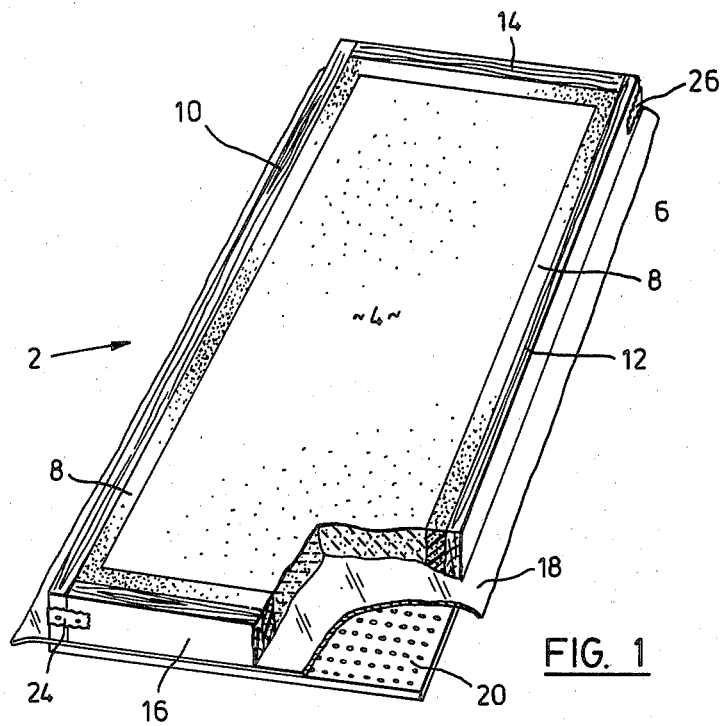
FIG. 1 is a cut-away perspective view of a fire-resistant core structure in accordance with the present invention without or before the applied skin.

FIG. 1 illustrates an embodiment of a fire-door core made in accordance with the present invention, prior to the application of the skin or veneer which commonly forms part of the completed door. The core 2, as illustrated, has a slab 4 which comprises a large central portion 6 which, ideally, in accordance with the objects of the present invention, is relatively light but substantially rigid (by which it is meant to imply that it is inherently strong enough to be capable to retaining its shape under gravitation or other mild forces) and is fire proof as well as capable of resisting deterioration or deformation under heat. The central portion 6 is surrounded by a relatively narrow border 8 of a somewhat more dense, tough, resilient and heavier material capable of adding some strength to the door and resilient enough to withstand the impact of nails or the penetration of screws, and which is also fire proof and heat-resistant. The border is preferably bonded to the central portion 6 along their mutual interfaces.

Immediately adjacent to the border portion of the core and forming the peripheral edge of the core (as well as the finished door) are the wooden stiles 10 and 12 and the rails 14 and 16 respectively.

The wooden stiles and rails not only define the outer periphery of the door but also allow it to be trimmed to the desired dimension while still presenting a wood exterior which is considered attractive on a wooden door and is suitable for staining or painting, and yet is sufficiently fire-resistant for most standards and is very good at resisting heat buckling or thermoconductivity.

This internal structure of the door, as illustrated in FIG. 1 and described above, is usually finished by applying a thin layer of wood veneer, plywood veneer, synthetic plastic veneer, or metal on the opposite planar surfaces by gluing or other conventional methods which are known to those skilled in the art and therefore not illustrated or dealt with in detail here.

FIG. 1 also illustrates a thin film 18 lying between the core structure and the underlying layer of cardboard or pegboard 20, both of which are not part of the final core structure, but serve a purpose in the manufacture thereof which will be described hereinafter.

The construction of the illustrated embodiment of the invention can be better understood by a description of the manufacturing process as illustrated in FIGS. 2, 3, 4, and 5.

In the first stage in the production of the core, the wooden stiles and rails 10, 12, 14 and 16 are assembled in a rectangular form equivalent to the ultimate dimensions of the door and joined at their corners as illustrated in FIG. 1. Corner brackets, such as illustrated at 24 and 26, are ideally employed to fasten the corners securely together. Although these are removed from the final door, they serve to keep the stiles and rails in place during manufacture.

The rectangle formed of the stiles and rails is then placed flat on a sheet of corrugated cardboard or, preferably, pegboard, or other similar flat stiff planar material, 20. Although cardboard and other materials will do, it has been found that pegboard is especially suitable for this purpose because the numerous holes patterned in the material allows for efficient heat dissipation during the curing process.

This board has on its upper surface a sheet of non-adhering material 18 such as freezer wrap or other plastic film. Where cardboard or the like is used, a non-stick polymeric emulsion material may be sprayed on, but where a material such as pegboard with holes in it is employed, a sheet material must be used to prevent the penetration of the liquid slurry referred to hereafter.

Figure 2:
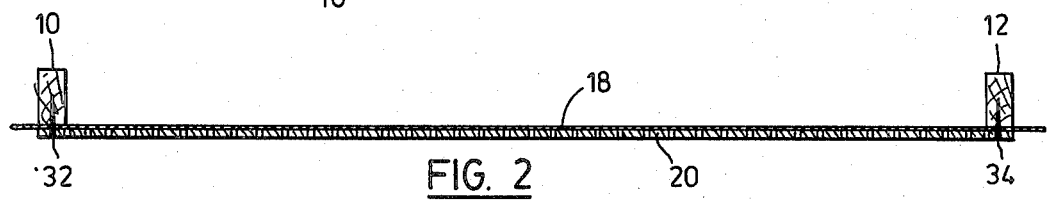
FIG. 2 illustrates the preliminary stage in the preparation of the production of a fire-resistant core of the present invention.

The board and the intervening film or sheet are then fastened to the rectangular wooden stiles and rails by means of staples extending through the board 20, as is illustrated at 32 and 34 in FIG. 2. Thus, at the stage illustrated in FIG. 2, one has an opened top vessel or mold with a film-covered pegboard forming the bottom and the stiles and rails forming the sides of a cavity suitable for forming the slab 4 of the core.

Figure 3:
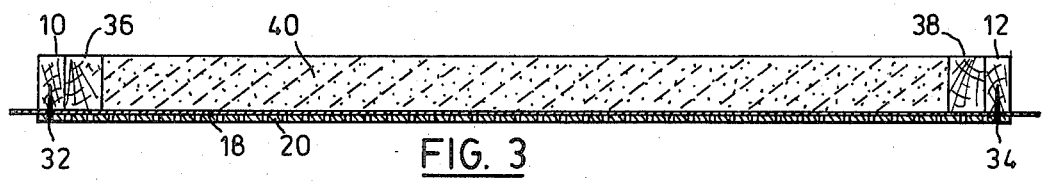
FIG. 3 illustrates a stage in the production of the said core subsequent to FIG. 2.

In FIG. 3 the process has progressed to the extent that the structure of FIG. 2 has a set of inserts 36 and 38 respectively lying immediately adjacent and along the inner side of the stiles 10 and 12. Similar inserts not illustrated are placed along the length and immediately adjacent to the inner edge of the rails 14 and 16. These inserts may be lengths of wood or similar material which are later removed and reusable time after time.

The mold cavity formed by this structure is then filled by a mixture 40 to the level of the top of the stiles and rails. This level can be achieved by drawing a scraper formed by the edge of a board or the like across the top of the stiles until the mixture 40 is level therewith. This mixture then cures to form a rigid central portion 6 of the slab 4, as referred to in FIG. 1.

As previously mentioned, it is desirable to have a core which fills the cavity of the door, is fire-resistant and relatively low in heat transmission and yet sufficiently light but strong to provide strength and resist buckling under heat without contributing to an excess amount of weight to the door.

I have found that such a substance can be formed by curing a mixture of magnesium chloride in water with magnesium oxide (crystals), together with perlite and fibreglass strands, and pouring the mixture into the mold between the inserts and levelling it and allowing the mixture to age or cure.

Although experiment and trial and error might reveal other quantities which form similar or alternative but acceptable characteristics, I have found that a mixture of the following ingredients and proportions in the following sequence is highly effective for the purpose of this invention.

In my preferred embodiment I mix a batch of approximately 52 pounds of magnesium chloride flakes in approximately 13 gallons of water to a consistency of approximately 22 "Baum A" at 65° to 67° F. To this solution in a mixer is added approximately 30 pounds of magnesium oxide. The resulting mixture of magnesium chloride and magnesium oxide is sometimes known as magnesium oxy-chloride. I then add approximately 2.5 cubic feet of granulated perlite and approximately 624 grams of chopped fibreglass strands.

This mixture is mixed for approximately 7 minutes before it is batch poured into the mold and levelled off as illustrated in FIG. 3.

Figure 4:
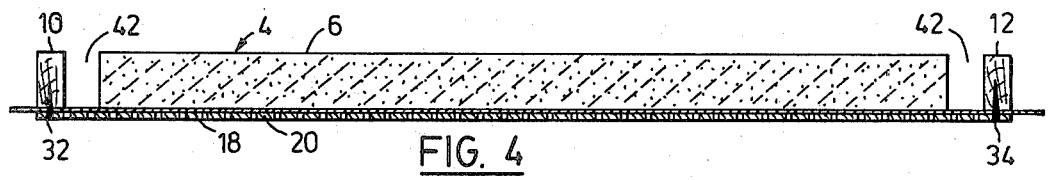
FIG. 4 is a stage in the production of the aforesaid core subsequent to FIG. 3.
Figure 5:
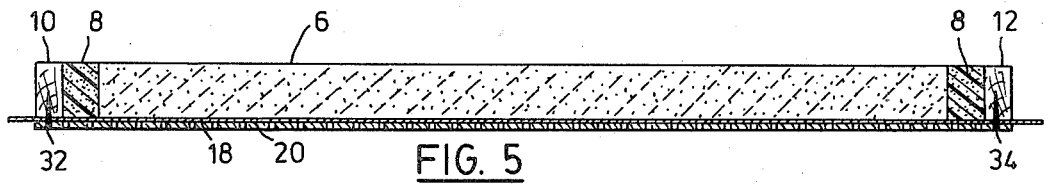
FIG. 5 illustrates the stage of production prior to application of the outer skins.

I have found that in approximately 1 hour this mixture will set to sufficient consistency that the inserts 36 and 38 (and others not shown) can be removed without the central portion 40 slumping. The removal of the inserts leaves a trough 42 around the outside of the central portion 40, as illustrated in FIG. 4, into which is poured a second mixture designed to cure into a heavier, stronger, denser material which nevertheless retains its fire, heat and buckling resistance as aforementioned.

I have found that a suitable mixture for forming the border 8 in the cavity 42 can be prepared by starting with a similar mixture of magnesium chloride in water to form a slurry of consistency known as 22 "Baum A" at 65°-67° F., with a similar amount of magnesium oxide, and a similar 624 grams of fibreglass chopped strands, but with no perlite. To this mixture is added a large volume of wood chips forming about 80% by volume or 5 cubic feet in the mixture of the quantities mentioned above. This mixture is mixed for approximately 7 minutes and poured into the trough 42 sometime in the period approximately 1 hour to 2 hours after forming the central portion. I have found that the timing of this sequence aids in establishing a bond between the central portion 6 and the border portion 8 of the core.

The core is then allowed to cure. Through experimentation it has been found that the curing process is important and ideally should be controlled to produce a core with the desirable strength and texture.

Once the slab has been poured (keeping in mind that the border portion is poured approximately an hour to 2 hours later), the mixture cures by an exothermic reaction. Using a pegboard with holes allows dissipation of heat and ideally the pegboard should be raised up on a pallet or supporting boards.

The initial 4 hours of curing should be carried on at a temperature of about 70°±8° F. with a humidity of 50%±5% during this initial exothermic stage.

Thereafter, it should be cured for an additional approximately 6 hours in a room or atmosphere heated to approximately 125° F. at a humidity preferably at or below approximately 8%. In dryer climates the ambient atmosphere may be sufficiently dry but in moister climates it may be necessary to air-condition the room where the curing occurs.

After curing overnight or half a day, the door is ready to be sanded smooth enough to apply the veneer skins or to trim the stiles and rails to the desired shape and dimensions.

It has been found that a border of the material described above is suitable to provide sufficient bonding with the central portion of the core 6 as well as the stiles and rails to which it abuts and provides a strong backing behind the stiles and rails capable of receiving nails and screws when hinges and other hardware are applied to the door.

After curing the pegboard sheet 20 can be easily removed from the underside of the door by removal of the staples 32 and 34 and I have found that the non-adhering films such as freezer wrap or other polymer emulsions serve to prevent the core material from sticking to the pegboard and in fact the film itself can easily be removed from the undersurface of the core.

If a non-perforated board such as cardboard is used, a non-stick polymer emulsion may be applied to the surface thereof by spraying instead of using an overlying film and the same purpose will be achieved and once the cardboard has been used twice (once on each surface), it can be used for packaging and shipping of finished products without incurring much cost in wastage. In fact such a coating eliminates the occasional incidents where the film wrinkles or bubbles up and distorts the surface of the core on the underside, but a non-perforated board has the disadvantage that it does not so easily dissipate the heat during the exothermic curing stage.

As aforementioned, it is generally necessary to trim both faces or at least the upper face of the door by sanding or planing in order to provide a smooth even surface on which to apply the skin veneer which is generally attached by means of glue.

The clips 24 and 26 serve to hold the stiles and rails in position during the sanding and planing process when they are occasionally knocked loose by the machinery and are potentially dangerous to by-standers or capable of fouling the sanding or planing machines.

Thus, by means of the present invention, I provide a fire-door core which is relatively simple, inexpensive and easy to manufacture, yet meets the requirements of fire-resistant standards as demonstrated by the fact that a door manufactured in accordance with the present invention, 1¾ inches thick having a core 1½ inches thick has successfully passed the Warnock Hersey Professional Services Inc. fire-resistance test and has received a certificate for a rating of 1½ hours under their standard test.

Furthermore, the present invention provides a door meeting these standards which has a relatively light weight core so that it is easy to transport and handle and can be hung on conventional walls and door frames without exceptional and expensive supporting structure.

It is theorized that the core is sufficiently strong by virtue of the magnesium oxy-chloride which has the additional advantage that it serves as an effective bonding agent between the central portion 6 and the border portion 8, as well as the wooden stiles and rails, and yet is sufficiently light by virtue of the inclusion of perlite and voids. The fibreglass adds additional tensile strength.

It should be realized that perilite varies greatly in its density and consistency and fibreglass strands may also vary, and therefore the exact mixtures may depend to a certain extent on the nature of the ingredients involved, as will be understood by those skilled in the art.

By using the stiles and rails as the sides of a mold and stapling the pegboard to the bottom thereof, a cavity is created suitable for the inplace forming of the core without requiring separate molds as are commonly used in the industry to form the cores in processes using assembly lines and manufacturing machinery. This machinery is thus eliminated and the bonding of the core to the border and to the stiles and rails is achieved while the core is curing and does not require a separate gluing process.

It will be realized that although the foregoing description of the inventor's preferred embodiment includes specific quantities, materials and procedures, modifications and variations thereof might be employed without departing from the inventive concept herein.

What I claim as new and desire to protect by Letters Patent of the United States is as follows:

1. A core for a fire-resistant door comprising wooden stiles and rails forming the peripheral edges of said core;
   a slab filling the space between the surfaces of and surrounded by said stiles and rails;
   said slab comprising a cured mixture of magnesium oxy-chloride containing inclusions of fibreglass strands, and perlite.

2. A core for a fire-resistant door as claimed in claim 1 in which said slab has a border portion adjacent said stiles and rails composed of a cured mixture of magnesium oxy-chloride containing fibreglass strands and approximately 80% by volume of wood chips.

3. A fire-resistant core as claimed in claim 1 in which said mixture comprises approximately 52 pounds of magnesium chloride flakes, 13 gallons of water, 30 pounds of magnesium chloride, 2.5 cubic feet of granulated perlite, and 624 grams of chopped fibreglass strands.

4. A fire-resistant core as claimed in claim 3 in which said slab has a border portion adjacent said stiles and rails composed of a cured mixture comprising approximately 52 pounds of magnesium chloride flakes, 13 gallons of water, 30 pounds of magnesium oxide, 624 grams of fibreglass chopped strands and 80% by volume of wood chips.

5. A method of making a fire-resistant door core comprising the steps of forming a rectangular frame of stiles and rails;
   fastening a sheet of planar material to the underside of said frame to provide a bottom to a mold formed by the cavity surrounded by said frame stiles and rails;
   pouring a mixture of material curable to form a core slab in the cavity formed by said frame;
   allowing said material to cure and bond to said stiles and rails to form an inner panel.

6. A method as claimed in claim 5 in which said stiff sheet is overlain by a layer of non-adhering material.

7. A method as claimed in claim 6 in which said stiff planar sheet is perforated pegboard.

8. A method as claimed in claim 5 including the steps of placing inserts along the inner side of the stiles and rails and removing said inserts after said core material has harden sufficient to resist slumping;

filling the space vacated by the inserts with a material curable to form a border of dense material comprising magnesium oxy-chloride with inclusion of wood chips comprising 80% by volume;

allowing said core slab material to cure during the exothermic stage at approximately 70° F. at approximately 50% humidity.

9. The method as claimed in claim 8 including the steps of further curing the core by placing same in an atmosphere of approximately 125° F. and less than 10% humidity for an additional 6 hours.

* * * * *